United States Patent

[11] 3,632,994

[72] Inventor Karl A. Brandenberg
Hayward, Calif.
[21] Appl. No. 875,856
[22] Filed Nov. 12, 1969
[45] Patented Jan. 4, 1972
[73] Assignee The Aro Corporation

[54] PNEUMATIC TAPE READOUT APPARATUS
6 Claims, 6 Drawing Figs.

[52] U.S. Cl. 235/61.11 J
[51] Int. Cl. G06k 7/02
[50] Field of Search 235/61.117, 61.11, 200, 201, 61.113; 178/17 D; 271/5, 11, 20; 226/95, 97

[56] References Cited
UNITED STATES PATENTS
3,231,720 1/1966 MacNeill 235/61.113
3,263,316 8/1966 Schrader 226/97
FOREIGN PATENTS
1,175,053 11/1958 France 235/61.117

*Primary Examiner*—Maynard R. Wilbur
*Assistant Examiner*—Leo H. Boudreau
*Attorney*—Allegretti, Newitt & Witcoff

ABSTRACT: A pneumatic tape reader for generating control programs from a punched tape includes a supply head, a reader head, a stepping motor to drive an advance sprocket and a tape-retaining lever pivotally attached to the supply head. A pressure pulse supplied to the stepping motor advances the tape, the advance occurring only on pneumatic pulse discharge. The retaining lever acts to retain the tape against the sprocket and also is adapted to lock the tape in a substantially fluidtight position between the supply head and reader head.

Inventor:
Karl A. Brandenberg
By Bair, Freeman & Molinare
Attys.

Inventor:
Karl A. Brandenberg
By Bair, Freeman & Molinare
Attys.

PNEUMATIC TAPE READOUT APPARATUS

BACKGROUND OF THE INVENTION

It is often desirable to control pneumatically operated devices by means of pneumatic logic devices or control mechanisms. To provide for complex control of various operations, it has been found that fluid logic elements can be programmed to provide for a sequence of operations. The implementation of such a program may be made by means of a punched tape whereby the program is in the form of high or low pressure signals resulting from a readout of the tape.

It is thus desirable to provide a tape readout mechanism wherein the tape may be easily inserted into the tape reader device and which also provides for advancement of the tape as well as efficient readout. Such a tape reader should also utilize standard available tape, have a high cycling rate or rate of reading the tape, and have a wide range of pressure over which the device is useful.

SUMMARY OF THE INVENTION

In a principal aspect, the present invention comprises a tape reader for fluid signal output comprising a supply head and a reader head having at least two matching passages in each head for passage of fluid therethrough whenever tape openings are positioned between said heads. A tape advance mechanism is also provided. The tape advance mechanism is adapted to advance the tape whenever fluid pressure is removed from the supply head.

It is thus an object of the present invention to provide an improved tape reader for fluid outputs.

It is a further object of the present invention to provide a tape reader operable over a side range of pressures with a cycling rate up to 200 cycles per minute.

Still a further object of the present invention is to provide a tape reader adapted to securely hold the tape in position when sensing output signals and adapted to advance the tape in measured increments while still maintaining a substantial seal between the reader heads and the tape.

One further object of the present invention is to provide a tape reader wherein the tape is easily accessible for replacement or repair.

These and other objects, advantages and features of the present invention will be set forth in greater detail in the description which follows.

DETAILED DESCRIPTION OF THE DRAWING

In the detailed description which follows reference will be made to the drawing comprised of the following FIGS.:

FIG. 1 is a schematic of the tape reader of the present invention with an endless tape positioned therein;

FIG. 2 in an enlarged side cross-sectional view of the tape reader of the invention;

DESCRIPTION OF THE PREFERRED EMBODIMENT

Figures 1, 2:
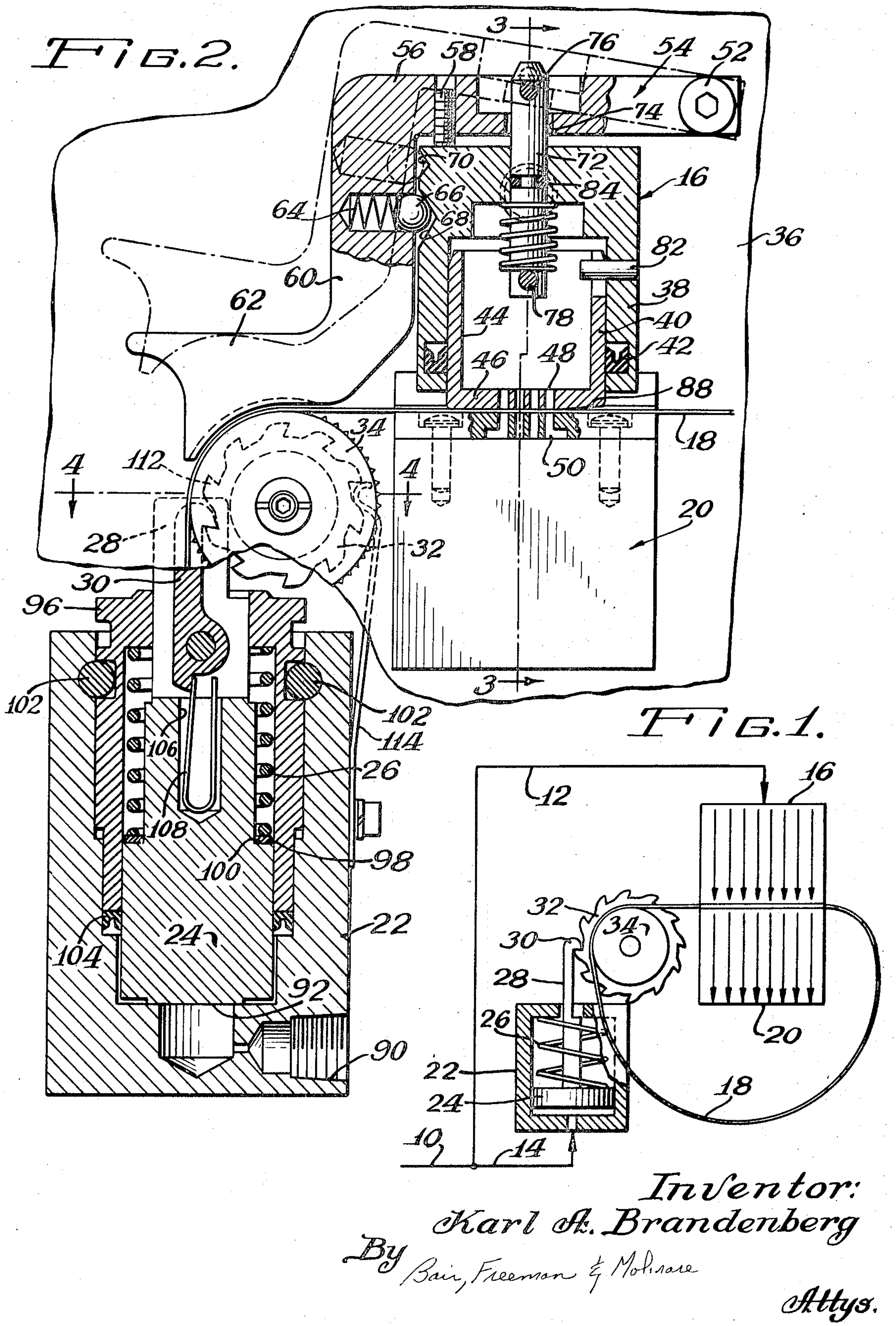

Referring now to FIG. 1, there is illustrated in a schematic diagram the basic operation of the tape reader of the present invention. Air is provided through an input line 10 which divides into a supply head line 12 and an advance mechanism line 14. The air through the supply head line 12 passes into the supply head 16, through openings in the punched tape 18, and finally into corresponding openings or passages defined in the reader head 20. The output from the reader head 20 is then directed to a fluid logic circuit, for example.

Air passing through the advance mechanism line enters the cylinder 22 causing a piston 24 to move upwardly against the biasing force of a spring 26. A rod 28 of the piston 24 includes a pawl 30 adapted to engage a ratchet wheel 32. The ratchet wheel is connected to a sprocket wheel 34 which engages the tape 18. Thus, when air pressure is provided in the lines 10, 12 and 14, the piston 24 is placed in the "up" position and fluid signals are provided through the heads 16 and 20. This provides an output signal through appropriate openings in the stationary tape 18. When pressure through the lines 10, 12 and 14 terminates upon completion of a single readout operation, the piston 24 is biased downwardly by the spring 26 causing the ratchet wheel 32 to advance a single increment. This, in turn, advances the sprocket wheel 34 and the tape 18 to the next logic frame.

Referring now to FIG. 2, there is shown in greater mechanical detail the construction of the device schematically illustrated in FIG. 1. The device is mounted on a plate 36. The supply head 16 is comprised of an outer cylinder portion 38 with a piston 40 mounted for slidable movement therein. A circumferential seal 42 surrounds the piston 40. The interior of the piston 40 defines a bore 44. The end or head 46 of the piston 40 includes a plurality of supply passages 48 through which air may flow through openings in the tape 18 and into corresponding reader passages 50 in the reader head 20.

Pivotally attached by means of a bolt 52 to the plate 36 is a retaining lever 54. The lever 54 includes a first horizontal run 56 extending from the bolt 52 substantially over the top of the supply head 16. An adjustment bolt 58 is preferably inserted in the lower part of the run 56 to provide for adjustment of the spacing of the lever 54 from the head 16.

Extending vertically downward from the horizontal run 56 is a vertical run 60. The vertical run 60 then connects with a second horizontal run 62 which is adapted to cooperate with a sprocket wheel 34 in a fashion to be more fully described below. On the inside of the vertical run 60 is a latching mechanism comprised of a spring 64 which biases a ball bearing 66. The ball bearing 66 is adapted to ride in a locked position detent 68 or an open position detent 70 defined in the cylinder housing 38. Thus when the retaining lever 54 is lowered against the sprocket wheel 34, the ball bearing 66 locks the lever 54 by engaging the detent 68. The position at which the ball bearing 66 engages the detent 68 is determined by the adjustment screw 58. Alternatively, when the lever 54 is disengaged from the sprocket wheel 34, the ball bearing 66 lodges in the detent 70 to hold the lever 54 in a fixed, open position.

Figures 3, 5:
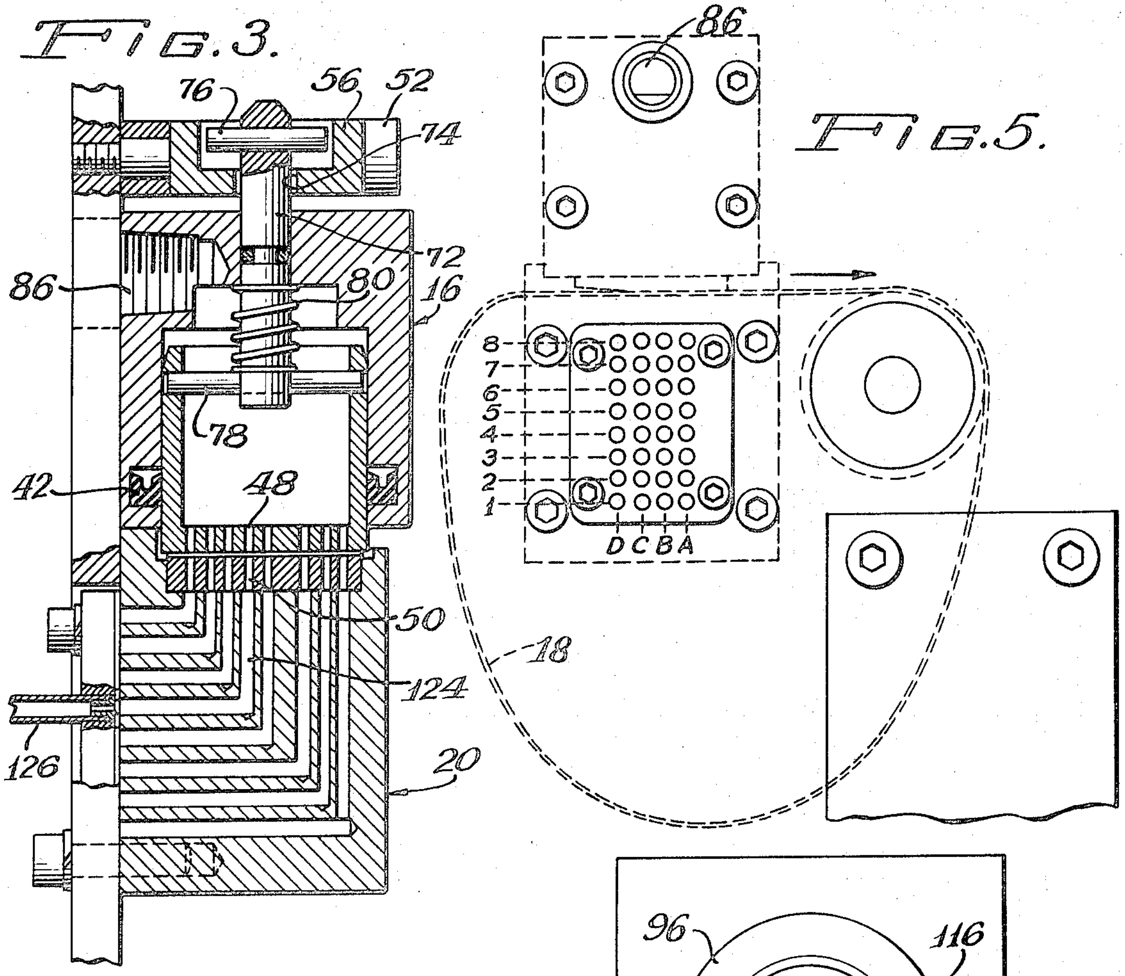
FIG. 3 is a cross-sectional view of the reader head of the tape reader of the invention taken substantially along the line 3—3 in FIG. 2.
FIG. 5 is a rear view of the device illustrating the fluid output passages of the tape reader head.

Connected between the piston 40 and the lever 54 is a shaft 72. The shaft 72 extends through an opening 74 in the upper horizontal run 56 of the lever 54 and is retained by means of a pin 76. Passing through the lower end of the shaft 72 is a second pin 78 as also illustrated in FIG. 3. Pin 78 engages openings in the side of the piston 40 to thereby connect the shaft 72 with the piston 40. A spring 80 is positioned between the pin 78 and the top of the cylinder 38. The spring 80 is always maintained slightly in compression to thereby bias the piston 40 in a downward direction against the tape 18.

Another pin 82 prevents piston 40 from rotating, thereby assures proper alignment of holes 48 with holes 50. An O-ring 84 provided in an annular recess of the shaft 72 provides a substantially airtight seal between the shaft 72 and the cylinder 38. An air or fluid pressure inlet 86 leads into the region behind the leading edge of the piston 40. Air pressure through the inlet 86 acts the drive the piston 40 into sealing contact with the tape 18 as well as provide an air fluid flow through appropriate passages 48 in the tape 18.

The head 46 of the piston 40 besides including the supply passages 48 has a distinctively shaped face. The leading edge 88 of the face of the head 46 is inclined upwardly away from the direction of travel of the tape 18. This prevents undue stress during tape advance when a tape splice is pulled between piston 40 and reader head 20.

Reference is now made to the construction of the stepping motor and sprocket drive for the tape 18. Referring particularly to FIG. 2, the cylinder 22 includes an air inlet 90 which provides air pressure against the face 92 of the piston 24. The piston 24 is biased downwardly by spring 26 positioned between a bearing 96 and a ring 98. Ring 98 rests on a flange 100 of the piston 24. The bearing 96 is maintained in position by means of two lock pins 102 and is sealed against the piston 24 and cylinder 22 by means of a seal 104.

Extending from an opening 106 bored in the unpressurized end of the piston 24 is a spring 108. The spring 108 biases the pawl 30 pivotally attached to the rod 28 extending from the piston 24. The pawl 30 engages with teeth as at 112 of the ratchet wheel 32. A locking leaf spring 114 attached to the cylinder 22 also engages the teeth 112 to prevent the ratchet wheel from moving except when engaged and driven by the pawl 30 in the forward direction.

Figure 4:
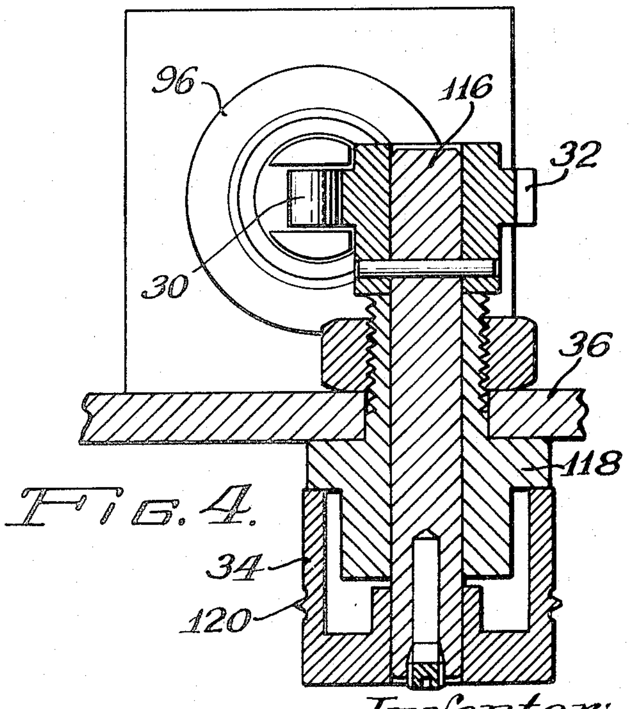
FIG. 4 is a top cross-sectional view of the tape-advancing mechanism or sprocket of the tape reader taken substantially along the line 4—4 in FIG. 2.

As illustrated in FIG. 4, the ratchet wheel 32 is attached to a shaft 116 which fits through a bearing 118 in plate 36 and is fixed to the sprocket 34. The sprocket 34 includes spaced teeth as at 120 which are adapted to engage correspondingly spaced openings as at 122 of FIG. 6 in the tape 18.

As is further illustrated by FIGS. 3 and 5, the reader head 20 includes a plurality of passages 50 which mate with or correspond with the supply passages 48. The passages 50 connect with channels as at 124 in the reader head 20 and ultimately connect with output tubing as at 126 which lead to a pneumatically driven and controlled control device (not shown). As illustrated in FIG. 5, which is a view of the output channels of the reader head, the output signals are divided into eight tracks numbered 1 through 8 and four lines designated as A, B, C and D. The device therefore has a maximum reading capacity of 32 channels.

In operation the tape 18 is positioned between the supply head 16 and reader head 20 and over the sprocket 34. The retainer lever 54 is then lowered into position to hold the tape against the sprocket 34 and simultaneously to bring the piston 40 in compression against the tape 18. Upon the introduction of a fluid signal, the piston is substantially sealingly compressed against the tape 18 to provide output signals to the reader head 20. At the same time the piston 24 of the stepping motor is driven upwardly against the force of the spring 26. The sprocket 34 however does not advance at this time.

Figure 6:
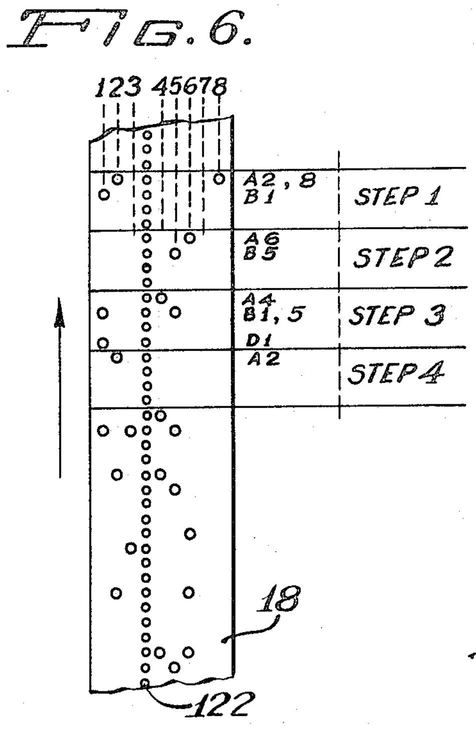
FIG. 6 is a segment of a tape utilized in combination with the tape reader of the present invention.

As illustrated in FIG. 6, the output through the reader head 20 is determined by the holes punched in the tape 18. For a single step such as step 1, the output would thus be through the openings designated as A2, A8 and B1. Upon removal of the pulse through the line 10 as illustrated in FIG. 1, the piston 24 and consequently the pawl 30 retracts. Simultaneously the air pressure against the piston 40 is removed and the tape 18 is enabled to advance as the ratchet wheel 32 is turned by action of the pawl 30 thereon. The tape 18 is then ready for output of the fluid signal as denoted by step 2, namely output through openings A6 and B5.

The device is operable with standard EIA tape and, as stated before, has a reading capacity of 32 channels. The tape thus advances in blocks or increments of four lines. The operating pressure of the stepping motor is generally in the range of 25 to 150 pounds per square inch whereas the operating pressure of the reading head is in the range of 0 to 100 pounds per square inch. The maximum rate of advance of the tape through the device is on the order of 200 cycles per minute. Generally, in operation, the ends of the tape are spliced together as illustrated in FIG. 1 and FIG. 5 and the operational output through the device is continuous as the device operates to repeatedly perform some desired function.

While there has been set forth a preferred embodiment of the present invention, it is contemplated that other obvious mechanical equivalents are available which are within the scope of the following claims.

What is claimed is:

1. An improved pneumatic tape reader and advance mechanism comprising, in combination;

a tape reader head having a plurality of fluid reader passages, a tape input head having a plurality of fluid supply passages in register with the passages of said reader head, and connectable through a tape with selected passages of said reader head, a tape sprocket mounted for engaging a tape which passes between said heads, for drawing said tape between said heads, fluid driven sprocket rotation means, and a single common pressurized fluid source, said sprocket rotation means and said input head being simultaneously connected to said common fluid source which fluid source provides fluid signals through said passages while simultaneously setting said sprocket for advancement of said tape between said heads and which, upon removal of said signals through said passages, initiates operation of said rotation means to hereby provide sprocket and tape advancement.

2. The improved reader of claim 1 wherein said tape input head includes a piston in communication with said fluid pressures source, said piston being biased into communication with said tape and thereby securing said tape between said heads when said fluid pressure source provides the signal through said heads.

3. The improved reader of claim 1 wherein said sprocket includes a ratchet mechanism engaged by a pawl of said sprocket rotation means, said pawl operative to provide for rotation of said sprocket in one direction to advance said tape, and wherein said sprocket rotation means also includes a pressure responsive piston in communication with said fluid pressure source, said piston reactive to position said pawl with said ratchet whenever said piston is translated by said fluid pressure source, said piston being normally biased against force imparted upon said piston by fluid pressure, said ratchet and attached sprocket being subsequently advanced by said pawl whenever said fluid pressure source is inoperative to position said piston.

4. The improved reader of claim 1 including a lever coupled with said tape input head, said lever also including an extension member for cooperation with said sprocket, said lever having a first position for engaging said tape input head with said tape and for also engaging simultaneously said extension in cooperation with said sprocket to hold said tape in communication between said heads and with said sprocket during utilization of said reader, said lever having a second position for release of said heads from said tape and simultaneous release of said extension from cooperation with said sprocket.

5. The improved reader of claim 4 wherein said lever includes a detent mechanism for maintaining said lever in said first or said second positions.

6. The improved reader of claim 4 wherein said input head includes a piston in communication with said fluid pressure source and also mechanically coupled with said lever, said lever operable to position said piston against a tape between said heads and said fluid pressure signal operable to additionally bias said piston against said tape.

* * * * *